Oct. 5, 1965  W. C. BROOKE  3,210,021

TOROID WINDING MACHINE

Filed June 30, 1961  2 Sheets-Sheet 1

INVENTOR.
WENDELL C. BROOKE
BY HIS ATTORNEY

Oct. 5, 1965 W. C. BROOKE 3,210,021
TOROID WINDING MACHINE
Filed June 30, 1961 2 Sheets-Sheet 2
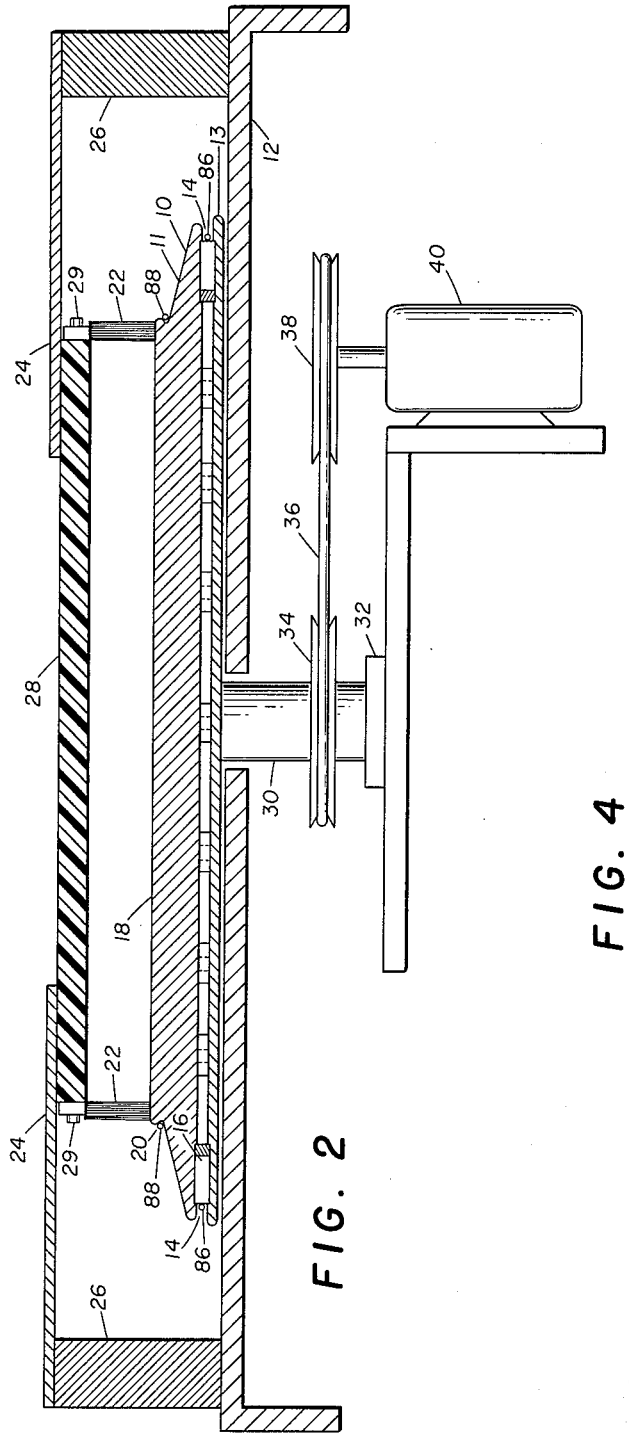
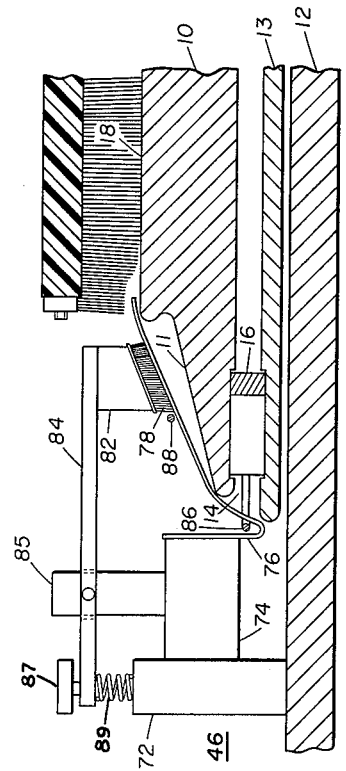
INVENTOR.
WENDELL C. BROOKE
BY HIS ATTORNEY United States Patent Office 3,210,021
Patented Oct. 5, 1965

3,210,021
TOROID WINDING MACHINE
Wendell C. Brooke, Dallas, Tex., assignor to Atlantis Electronics Corporation, Garland, Tex., a corporation of Texas
Filed June 30, 1961, Ser. No. 121,092
10 Claims. (Cl. 242—4)

This invention relates to winding machines and more particularly to an improved machine for mechanically winding magnet wire onto toroidal cores.

Very small toroidal cores of ferro-magnetic material have recently been accorded wide spread use in the electronic data handling art. In the co-pending application of Michael W. Tanney, Serial No. 179,505, filed June 30, 1961, now Patent No. 3,165,272 and assigned to the assignee of this invention, there is disclosed a toroid winding machine capable of mechanically winding magnet wire onto toroidal cores of exceedingly small diameter. The toroid winding machine described in the Tanney application constituted a great advance in the art in that its concept was radically different from the prior art machines and it provided, for the first time, a simple machine that could quickly and with a high degree of reliability mechanically wind very small magnet wire onto very small toroidal cores.

Briefly, in application Serial No. 179,505, now Patent No. 3,165,272 there is disclosed a toroid winding machine in which the toroidal core is mounted close by a rotatable disk. A separable loop of very fine leader material passes through a toroidal core and is held lightly to the rotatable disk, preferably by a plurality of permanent magnets. One end of the strand of magnet wire is tied to the leader. The other end of the strand of magnet wire is made stationary. As the disk rotates, the separable leader is made to rotate with it carrying the end of the magnet wire tied to the leader in a circular path that intersects the toroidal core. Each time the end of the magnet wire tied to the leader passes through the core, a loop is formed in the magnet wire, thereby placing one turn of a winding on the core. The unique manner of supporting and driving the leader allows the use of very small leader material, thereby permitting very small cores to be wound.

Although the invention described in the above referenced patent application Serial No. 179,505, now Patent No. 3,165,272, has greatly facilitated the mechanical winding of magnet wire onto very small toroidal cores, some difficulty has been encountered in its use. Perhaps the most troublesome problem that has arisen to date is the teendency for the leader to be bound to the toroidal core by the magnet wire that is being wound on the core. Some problems have also arisen in controlling the leader and magnet wire.

According to the present invention, an improved disk for supporting and rotating the leader is provided. The means for controlling and tensioning the magnet wire are also improved.

Many other objects and advantages of the present invention will become more readily apparent as the following detailed description of the preferred embodiment unfolds when taken in conjunction with the appended drawings wherein like reference numerals denote like parts and in which:

FIGURE 2 is a view, partially in cross section, along line 2—2 of FIGURE 1; and

FIGURE 4 is a view, partially in cross section, taken along line 4—4 of FIGURE 1.

Figure 3:
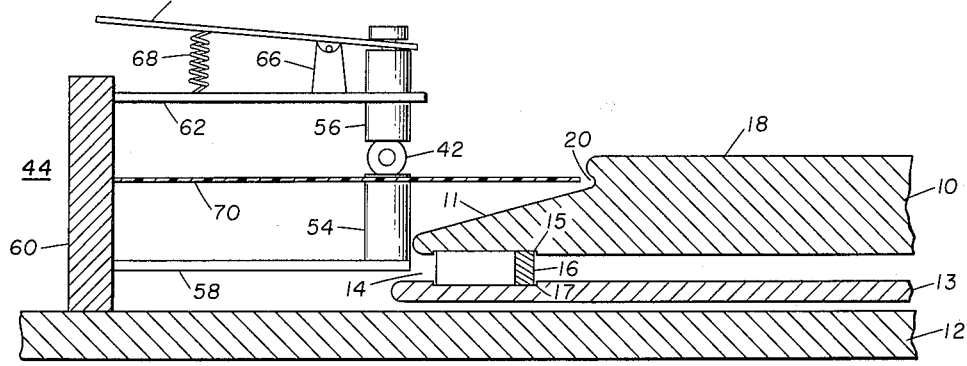
FIGURE 3 is a cross-sectional view taken along line 3—3 of FIGURE 1.

Turning now to the drawings, the toroid winding machine according to the present invention is seen to comprise a rotatable disk 10 mounted for rotation above a mounting plate 12. As best seen in FIGURE 3, disk 10 includes a conical portion 11 connected to a circular plate 13 by screws or other suitable means (not shown). A plurality of U-shaped permanent magnets 16 are positioned in the space between the conical portion 11 and the circular plate 13 with their pole pieces extending outwardly.

A leader drive groove 14 that extends about the periphery of the disk 10 is defined by the ends of the pole pieces of magnets 16 and the space between the conical portion 11 and the circular plate 13. The conical portion 11 is terminated with a concentrically located cylindrical portion 18. The wall of the cylindrical portion 18 is formed to define a wire drive groove 20 as shown.

Figure 1:
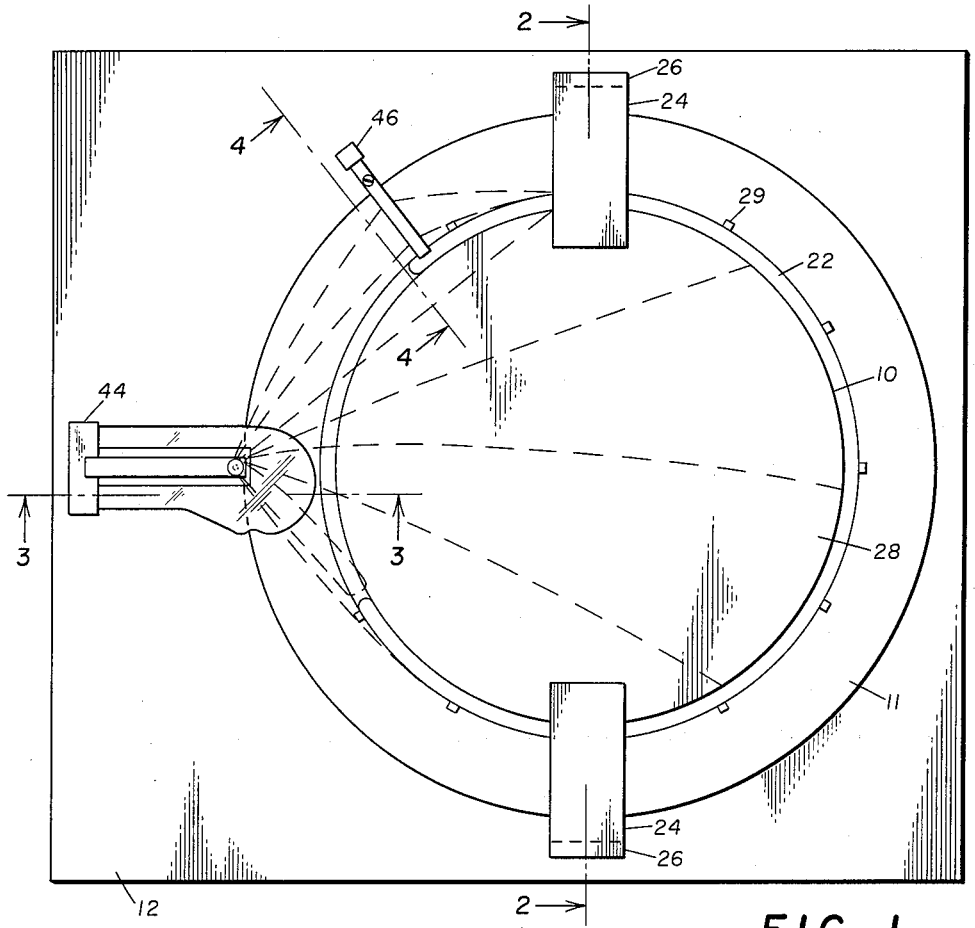
FIGURE 1 is a plan view of the toroid winding machine according to the present invention.

As best shown by FIGURES 1 and 2, a circular shaped brush 22 bears against the upper surface of the cylindrical portion 18. Plates 24 connected to members 26 support a circular plate 28 that is used for mounting the brush 22. The plate 28 is preferably of a clear plastic material. Set screws 29 allow the brush 22 to be raised or lowered to cause the brush 22 to bear against the disk 10 with the desired pressure.

The disk 10 is mounted on a shaft 30 that turns in a bearing 32. Rotation may be imparted to the disk 10 via pulley 34, belt 36, and pulley 38 that is driven by motor 40. Motor 40 is preferably of the variable speed type.

According to one specific example of the invention, the conical portion 11 of the disk 10 was machined from an aluminum plate 1 inch thick to have a diameter of 15 inches. A portion of the round plate thus formed was then removed to form the conically shaped member 11 that is terminated by a concentrically located cylindrical portion 18 approximately ⅜ inch high. The side of the conical member 11 slopes upwardly at an angle of approximately 15 degrees. The side of the cylindrical portion 18 was then shaped to define the wire drive groove 20.

The circular plate 13 was machined from ⅛ inch aluminum plate. It is practical for the plate 13 to be of a slightly larger diameter than the member 11. Grooves 15 and 17 were provided in the members 11 and 13 respectively to assist in positioning the magnets 16. The edges of the plate 13 and the conical shaped member 11 were rounded as shown.

Referring again to FIGURE 3, a toroidal core 42 upon which the winding of magnet wire is to be placed is held by a core holding fixture 44. The core holding fixture 44 maintains the core 42 spaced close by the periphery of disk 10 at approximately the same level as the upper surface of the cylindrical portion 18. The axis of the core 42 should be perpendicular to the radius of the disk 10, that would, if extended, pass through the core 42.

In the particular core holder shown, the core 42 is supported between a pair of tubular members 54 and 56. The lower tubular member 54 is rigidly mounted on a support 58 that extends outwardly from the mounting post 60. The upper tubular member passes through the upper support 62 in sliding relationship. The upper portion of the tubular member 56 is notched to allow attachment of a lever 64 that is connected to pivot 66. Downward pressure is maintained on the upper tubular member 56 by the spring 68 through the lever 64 acting in junction with the pivot 66. A leader support 70 is also provided. The leader support 70 is seen to comprise a flat plate that is located at a height slightly below the opening in the toroidal core 42. The leader support 70 allows the leader to pass through the core without actually contacting the core, and supports the magnet wire being wound on the core 42 as it is pulled away from the disk 10.

A tensioning device 46 is also provided near the periphery of the disk 10. The tensioning device 46 aids in controlling the magnet wire being wound on the core and functions to tighten each loop formed.

The tensioning device 46 used in this specific example of the present invention can best be understood by reference to FIGURE 4. As shown it comprises a post 72 from which a support 74 projects. Attached to the support in an adjustable manner is a member 76 that is preferably of spring steel. The member 76 defines a notched portion one side of which slopes gently upward and towards the center of the disk 10 such that the end of the member 76 extends over the edge of the portion 18. A brush 78 bears against the end of member 76. The brush 78 may be mounted to the post 72 by brush holder 82 and rod 84, the rod 84 being pivotably mounted to the post 85. Spring 89 and thumb screw 87 are provided for adjusting the force with which the brush 78 bears against the member 76. As shown, the base of the notched portion is approximately on a level with and close to the groove 14.

To operate the machine, a ferro-magnetic core 42 having the desired size and electrical characteristics is inserted in the core holding fixture 44 as shown. A leader of stiff ferrous material such as spring steel is threaded through the toroidal core 42 and the tensioning device 46. The ends of the leader are then connected to form a separable loop having a diameter slightly greater than that of the disk 10.

The preferred method of forming the leader into a separable loop is to attach a collar to one end of the leader by soldering or other means. The joint between the collar and the leader should be made smooth to prevent damage to the magnet wire that is to be applied to the core. The loop is completed by inserting the other end of the leader into the open end of the collar, the resiliency of the leader material maintaining the loop thus formed. This arrangement allows very small diameter wire to be used as the leader material.

A strand of magnet wire is attached to the separable leader. Power is then applied to the motor 40 causing the disk 10 to rotate. As the leader is held lightly in the leader drive groove 14 by the magnets 16, the leader will also rotate. After the leader has pulled a strand of magnet wire having a length approximately equal to the circumference of the disk 10 through the magnetic core 42, the motor 40 is stopped and the loose end of the strand of magnet wire 88 is either held by the operator's hand or made stationary by tying it to the core 42 or the core holding fixture 44.

The motor 40 is again operated to cause the disk 10 and the leader to rotate. As that point on the leader to which the magnet wire is tied moves in a circular path, the magnet wire will ride up the sloped surface of the conical portion 11 until it comes to rest in the wire drive groove 20. The slope of the upper surface of the conical member 11 and the difference in the diameters of the groove 20 in which the magnet wire rides and the groove 14 in which the magnets 16 hold the leader provides good separation between the leader and the magnet wire which it is pulling.

After the full length of the strand of wire has been pulled through the core 42, the wire 88 will tighten and begin to slide between the tensioning brush 78 and the member 76. The force with which the brush 78 bears against the member 74 will determine the maximum amount of tension that will be developed in the magnet wire. With the leader 86 rotating and pulling on one end of the magnet wire and the other end of the magnet wire being held stationary, the magnet wire will slide through the tensioning device 46 and upon the upper surface of the disk 10. Further rotation of the leader 86 will cause the magnet wire 88 to slide across the upper surface of the disk as shown in FIGURE 1, wherein the position of the magnet wire at different points in the winding cycle is indicated by dashed lines.

The brush 22 presses against the upper surface of the disk 10 and controls the magnet wire 88 as it slides across the disk 10. Excellent control of the magnet wire is maintained as there will always be a small amount of tension on the wire sliding across the top of the disk 10 due to the force required to pull the wire between the disk 10 and the brush 22. That portion of the strand of magnet wire not sliding across the surface of the disk 10 will ride in the wire drive groove 20, thereby effectively maintaining control of the entire strand of magnet wire.

When that point of the leader 86 to which the magnet wire 88 is attached again passes through the toroidal core 42, a complete loop is formed. As the point continues its circular path, the loop will be decreased in size until the wire 88 is finally pulled out from under the brush 22 near the magnetic core 42. The cycle is then repeated with the tensioning device 46 tightening the loop around the core to the desired tension.

The maximum amount of tension that will ever be placed on the magnet wire 88 is that produced as it slides through the tensioning device 46. The brush 22 is a very soft one, preferably of very fine nylon so that it places only a small amount of tension on the wire. It is preferred that the circular brush 22 not form a complete circle in order that the magnet wire 88 can pull free of the brush 22 when the loop gets down to relatively small size. This insures that the pull will be against the brush 22 rather than the core 42.

It is also desirable that the magnet wire be released from the tensioning device 46 in a free condition and then allowed to slide under the brush 22. As shown in FIGURE 1 as the wire 88 slides across the top of the disk 10, it is subjected to a very light, relatively constant tension for most of its travel as the length of wire in contact with the brush 22 will remain virtually constant.

If the brush 22 extends in front of the tensioning device 46 in contacting relationship to the disk 10, the wire 88 will be subjected to much greater tensional forces as a considerably longer length of the wire will be sliding between the brush and the disk. As shown, the preferred arrangement is for the brush 22 to extend past the tensioning device 46 in a raised position such that a slot is formed between the brush 22 and the disk 10. This slot is tapered to allow the brush 22 to contact the disk 10 at the desired point.

It is evident that several important advantages are provided by this invention. For example, much better separation between the leader 86 and the wire 88 is obtained because of the separation in the grooves in which each is held. The tendency for the leader to be bound to the core by the magnet wire has been virtually eliminated as the leader is made to pass through the hole in the core at a point away from the winding. Much better over-all control of both the leader and the magnet wire is achieved.

Although the invention has been described with regard to a particular preferred embodiment, many changes and modifications will be obvious to those skilled in the art. The invention, therefore, is not to be limited to what is shown or described herein, but only as necessitated by the scope of the appended claims.

What I claim is:

1. A toroid winding machine comprising a rotatable disk, means for rotating said disk, core holder means for supporting a toroidal core, a leader for pulling a strand of wire through said core to form a loop, said rotatable disk including a raised cylindrical portion, the diameter of said raised cylindrical portion being less than the diameter of said rotatable disk, a plurality of magnets positioned in the side of said disk for holding said leader lightly against the side of said rotatable disk and a wire drive groove formed in the side of said raised cylindrical portion and spaced apart from said magnets and leader support means for supporting a portion of said leader away from said magnets and positioning said portion of said leader to pass through an opening in said core.

2. A toroid winding machine as defined in claim 1 further including means to tension said strand of wire and tighten said loop about said core.

3. A toroid winding machine as defined in claim 2 wherein said means to tension said wire and tighten said loop comprises an elongated member shaped to define a notch, the base of said notch being located in approximately the same plane as said magnets and one side of said notch extending over the edge of said raised cylindrical portion, and brush means bearing against said elongated member.

4. A toroid winding machine as defined in claim 2 including control means for controlling said wire to prevent tangling as it forms a loop.

5. A toroid winding machine as defined in claim 4 wherein said control means comprises a circular shaped brush of soft fibers bearing against at least a portion of the upper surface of said raised cylindrical portion.

6. A toroid winding machine as defined in claim 1 further including means for positioning said core holder means relative to said rotatable disk to support said core at a point spaced apart from the periphery of said disk and above said magnets.

7. In a toroid winding machine wherein a leader pulling a strand of magnet wire is held lightly to a rotating disk thereby causing said leader to rotate, the improvement comprising an improved disk shaped to define a raised cylindrical portion, the side of said raised cylindrical portion defining an outwardly facing wire drive groove, an outwardly facing leader drive groove, and means including a plurality of magnets for holding the leader lightly in said leader drive groove.

8. The improvement to a toroid winding machine as defined in claim 7 including a transition region between said wire drive groove and said leader drive groove which slopes up and in at an angle of at least 15 degrees.

9. In a toroid winding machine wherein a leader pulling a strand of wire is held lightly to a rotating member thereby causing said leader to rotate, the improvement wherein said rotating member comprises a conical portion terminated in a concentrically located cylindrical portion, a wire drive groove defined in the side of said cylindrical portion, an annular plate, means connecting said plate to said conical portion, and a plurality of magnets held between said conical portion and said annular plate, said magnets being arranged in a circular configuration with the pole pieces of said magnets directed outwardly, said pole pieces, said conical portion and said annular plate defining an outwardly facing leader drive groove spaced apart from said wire drive groove.

10. In a toroid winding machine wherein a leader pulling a strand of wire is held lightly to a rotating member thereby causing said leader to rotate, the improvement wherein said member includes an outwardly facing leader drive groove of one diameter, a plurality of magnets positioned to hold said leader lightly in said leader drive groove, and an outwardly facing wire drive groove of another diameter spaced apart from said leader drive groove, said wire drive groove being of smaller diameter than said leader drive groove.

References Cited by the Examiner

UNITED STATES PATENTS

| | | | |
|---|---|---|---|
| 2,865,573 | 12/58 | Tarara et al. | 242—4 |
| 2,944,745 | 7/60 | Bassett | 242—4 |
| 2,986,351 | 5/61 | Matthews | 242—4 |
| 3,000,580 | 9/61 | Matovich | 242—4 |

FOREIGN PATENTS 639,177  6/50  Great Britain.

MERVIN STEIN, *Primary Examiner.*

HARRISON R. MOSELEY, DAVID J. WILLIAMOWSKY, DONALD W. PARKER, *Examiners.*